(No Model.)

J. HUSSEY.
FILTER FOR GASOLINE STOVES.

No. 555,482. Patented Feb. 25, 1896.

WITNESSES:
Frances French.
Mont G Johnson.

INVENTOR
Joseph Hussey.
BY
Chas. A. Touch.
ATTORNEY.

UNITED STATES PATENT OFFICE.

JOSEPH HUSSEY, OF MADISON, WISCONSIN.

FILTER FOR GASOLINE-STOVES.

SPECIFICATION forming part of Letters Patent No. 555,482, dated February 25, 1896.

Application filed September 10, 1894. Serial No. 522,650. (No model.)

*To all whom it may concern:*

Be it known that I, JOSEPH HUSSEY, a citizen of the United States, residing at Madison, in the county of Dane and State of Wisconsin, have invented a new and useful Filter to be Used on Gasoline-Stoves, of which the following is a specification.

My invention relates to filters to be applied to gasoline-stoves between the tank and the burners and having an inlet or feed pipe from the tank and an outlet or supply pipe leading to the burners; and the objects of my invention are, first, to prevent explosions caused by a burner (when there are more than one in use at the same time) becoming stopped up by dirt in the gasoline, which will extinguish the flame, and later being freed and allowing the gasoline to flow and become ignited from the other burners, and, second, to produce more heat from a given quantity of gasoline by having a clean fire. I attain these objects by the mechanism illustrated in the accompanying drawings, in which—

Figure 3:
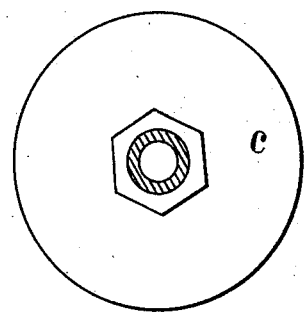
Figure 4:
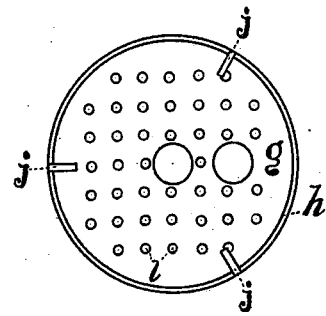
Figure 1:
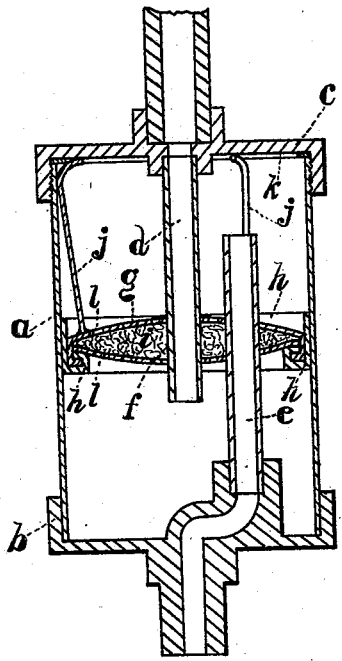
Figure 2:
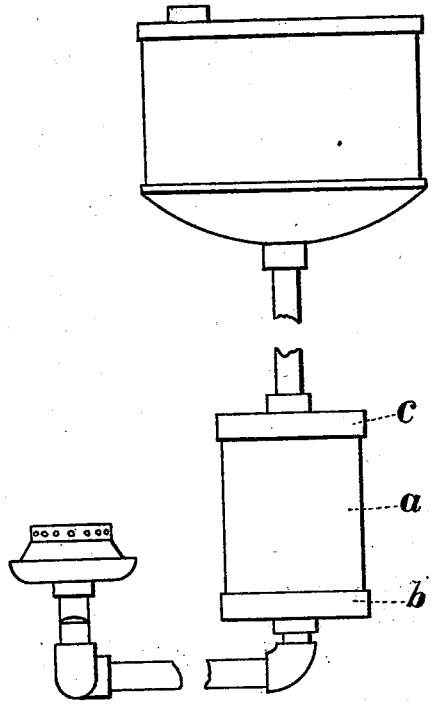

Figure 1 is a vertical section of the filter on line A B, Fig. 3. Fig. 2 is a front elevation of an ordinary gasoline-stove tank and burner, showing the position of the filter on the pipe between them. Fig. 3 is the top plate or cover to the filter, and Fig. 4 is a top view of the complete strainer removed from the casing.

Similar letters refer to similar parts throughout the several views.

The main cylindrical casing $a$, the bottom plate, $b$, and the top plate, $c$, form the casing of my filter. The bottom plate, $b$, is soldered to the cylinder $a$, but the upper end of said cylinder is threaded and also the inside of the flange of the top plate, $c$, which admits of the top being removed when required to clean out the cylinder or to adjust or repair the strainer, presently to be described. There is a gasket $k$, of suitable material, preferably rubber, which is fitted inside the flange on the top plate, $c$, and adapted to rest on the top edge of the cylinder, so as to form a liquid-tight joint when the two are screwed together.

The strainer is composed of an upper plate, $g$, made of tin or any sheet metal, and is circular in form, having a horizontal margin for a distance toward the center and then a convex surface, which is perforated, and on the extreme outer edge there is a downwardly-projecting flange, which is again turned inward, as hereinafter explained. The bottom or lower plate, $f$, is the same as the upper plate, $g$, except it has no flange and is placed inside of the flange, which it should fit closely with its convex side downward. Between these two plates is a layer of sponge $i$, and on the bottom of plate $f$ is a gasket $h$, which is a ring cut from some suitable sheet material, preferably rubber packing, the outside diameter of which should be equal to the diameter of the plate $f$ and the inside diameter enough less to provide sufficient material for the purpose desired. The said ring or gasket is then placed upon the plate $f$, and the two are put within the downwardly-projecting flange upon plate $g$ and the flange turned inward, thereby securely binding together the plates $f$ and $g$ with the gasket $h$ between them, which, being of an elastic material, is then turned outward and upward over the edge of the flange on plate $g$, forming a liquid-tight joint between the strainer and the casing $a$, as shown in Fig. 1, the object being to prevent any liquid passing between the outside of the strainer and the casing $a$ and also to hold the strainer central within the casing. On the top of the plate $g$, a little distance in from the edge and equidistant, are soldered three pieces of spring-wire $j$, which extend upward to the under side of the cover $c$ for the purpose of holding the strainer the proper distance from the same and also to prevent it moving from a horizontal position. The said rods $j$ also diverge sufficient to press against the cylinder $a$, and then curve inward, forming a means for drawing out the strainer when desired through the center of the plates $f$ and $g$, and also through the sponge $i$ is a hole to allow the pipe $d$ to pass, and to the right another hole for pipe $e$, as clearly shown in Fig. 1. Now in practice connect the pipe leading from the tank on a gasoline-stove with the top plate of my filter, thereby delivering the gasoline through pipe $d$ to the lower half of filter under the strainer, and it will raise and pass through holes $l$ in plate $f$, thence through sponge $i$, which will remove all impurities and dirt and discharge them through perforations in plate $g$ and pipe $e$ to the burners.

Having thus described and explained my invention, I desire to secure by Letters Patent the following:

The combination in a filter for gasoline-stoves of a circular strainer composed of two plates of perforated metal, $g$, $f$, with a layer of sponge, $i$, between them and a central hole and a hole to one side through the plates and sponge for pipes, $d$, $e$, to be inserted, and the upper plate, $g$, having a flange on the outer edge projecting downward to receive the plate, $f$, and rubber ring, $h$, and then being turned inward onto the ring, $h$, and binding the whole together, and the distance-rods, $j$, fastened to the top of plate, $g$, and extending outward to the casing, $a$, and upward to the cover, $c$, all substantially as described.

JOSEPH HUSSEY.

Witnesses:
AUGUST SCHEIBEL, Jr.,
DAVID A. MEMHARD.